(12) United States Patent
Miura

(10) Patent No.: US 7,632,776 B2
(45) Date of Patent: Dec. 15, 2009

(54) EXHAUST GAS PURIFYING CATALYST AND PRODUCTION PROCESS THEREOF

(75) Inventor: Masahide Miura, Imasato (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 338 days.

(21) Appl. No.: 10/589,421

(22) PCT Filed: Apr. 27, 2005

(86) PCT No.: PCT/JP2005/008466

§ 371 (c)(1),
(2), (4) Date: Aug. 15, 2006

(87) PCT Pub. No.: WO2005/102516

PCT Pub. Date: Nov. 3, 2005

(65) Prior Publication Data

US 2007/0129246 A1 Jun. 7, 2007

(30) Foreign Application Priority Data

Apr. 27, 2004 (JP) .............................. 2004-131612

(51) Int. Cl.
*B01J 23/10* (2006.01)
(52) U.S. Cl. ..................................... 502/304
(58) Field of Classification Search .................. 502/304
See application file for complete search history.

(56) References Cited

U.S. PATENT DOCUMENTS

| | | | |
|---|---|---|---|
| 7,314,846 B2 | 1/2008 | Kuno | |
| 7,384,888 B2 | 6/2008 | Kuno | |
| 2002/0049137 A1* | 4/2002 | Morikawa et al. | 502/351 |
| 2004/0087440 A1* | 5/2004 | Kuno | 502/304 |
| 2005/0059547 A1 | 3/2005 | Kuno | |
| 2007/0179052 A1 | 8/2007 | Hirabayashi et al. | |
| 2007/0197373 A1 | 8/2007 | Miura et al. | |
| 2007/0197379 A1 | 8/2007 | Miura | |
| 2008/0051283 A1 | 2/2008 | Miura | |

FOREIGN PATENT DOCUMENTS

| | | |
|---|---|---|
| EP | 1 516 855 A1 | 3/2005 |
| JP | A 2002-346386 | 12/2002 |
| JP | A 2003-277060 | 10/2003 |

\* cited by examiner

*Primary Examiner*—Melvin C Mayes
*Assistant Examiner*—Michael Forrest
(74) *Attorney, Agent, or Firm*—Oliff & Berridge, PLC

(57) ABSTRACT

The present invention provides an exhaust gas purifying catalyst and a production process thereof. An exhaust gas purifying catalyst of the present invention comprises a metal oxide particle (1, 2) and rhodium (3) supported thereon, the metal oxide particle (1, 2) comprising a core part (1) relatively rich in ceria and a surface layer (2) relatively rich in zirconia.

4 Claims, 3 Drawing Sheets

EXHAUST GAS PURIFYING CATALYST AND PRODUCTION PROCESS THEREOF

TECHNICAL FIELD

The present invention relates to an exhaust gas purifying catalyst and a production process thereof.

RELATED ART

The exhaust gas from internal combustion engines such as automobile engines contains nitrogen oxide ($NO_x$), carbon monoxide (CO), hydrocarbon (HC) and the like. These substances can be purified by an exhaust gas purifying catalyst capable of oxidizing CO and HC and at the same time, reducing $NO_x$. As for representative exhaust gas purifying catalysts, three-way catalysts where a noble metal such as platinum (Pt), rhodium (Rh) and palladium (Pd) is supported on a porous metal oxide support such as γ-alumina are known.

The metal oxide support may be formed of various materials but, in order to obtain a high surface area, alumina ($Al_2O_3$) has been heretofore generally used. However, in recent years, for accelerating purification of the exhaust gas by using the chemical properties of the support, it has been proposed to use various other materials such as ceria ($CeO_2$), zirconia ($ZrO_2$) and titanium ($TiO_2$) in combination with, or not in combination with, alumina.

For example, in order to alleviate the fluctuation of oxygen concentration in the exhaust gas and thereby enhance the exhaust gas purifying capacity of the three-way catalyst, a material having an oxygen storage capacity (OSC) of storaging oxygen when the oxygen concentration in the exhaust gas is high, and releasing oxygen when the oxygen concentration in the exhaust gas is low, is used as a support of the exhaust gas purifying catalyst. A representative material having OSC is ceria.

In order to allow for efficient progress of oxidation of CO and HC and reduction of $NO_x$ by the activity of the three-way catalyst, the air-fuel ratio in the internal combustion engine must be a theoretical air-fuel ratio (stoichiometric air-fuel ratio). Therefore, the fluctuation of oxygen concentration in the exhaust gas is preferably alleviated to maintain the oxygen concentration in the vicinity of the theoretical air-fuel ratio, so that the three-way catalyst can exert its exhaust gas purifying ability. Furthermore, according to recent studies, it has been found that ceria not only has OSC but also, by virtue of its strong affinity for a noble metal, particularly platinum, can prevent particle growth (sintering) of the noble metal supported thereon.

In this way, ceria has preferred properties for use in an exhaust gas purifying catalyst, but sometimes fails in satisfying heat resistance required in such usage. Accordingly, a method for elevating the heat resistance of ceria by forming a solid solution of ceria and zirconia has been developed.

Japanese Unexamined Patent Publication (Kokai) No. 2003-277060 discloses an exhaust gas purifying catalyst obtained by loading a noble metal on a support comprising a core part mainly composed of ceria and a surface layer mainly composed of zirconia. According to this exhaust gas purifying catalyst of Japanese Unexamined Patent Publication (Kokai) No. 2003-277060, it is stated that OSC can be provided by ceria in the core part and ceria-zirconia solid solution at the interface between the core part and the surface layer, and heat resistance can be provided by zirconia in the surface layer.

Also, use of zirconia as a catalyst support particle has been conventionally known and particularly, it is known that when rhodium is supported on a zirconia particle, the ability of generating hydrogen by steam reforming is elevated as compared with the case of loading rhodium on an alumina particle (see, for example, Japanese Unexamined Patent Publication (Kokai) No. 2002-346386)

The present invention provides an exhaust gas purifying catalyst having both OSC provided by ceria and heat resistance attributable to zirconia in good combination, and furthermore, despite the presence of ceria, assuring good function provided by the combination of rhodium and zirconia.

DISCLOSURE OF INVENTION

The exhaust gas purifying catalyst of the present invention is an exhaust gas purifying catalyst comprising a metal oxide particle and rhodium supported thereon, wherein the metal oxide particle comprises a core part relatively rich in ceria and a surface layer relatively rich in zirconia and, particularly, the core part and the surface layer each comprises a plurality of primary particles.

According to the exhaust gas purifying catalyst of the present invention, a metal oxide particle comprising a core part relatively rich in ceria and a surface layer relatively rich in zirconia is used, so that OSC provided by ceria in the core part and high heat resistance attributable to zirconia in the surface layer can be achieved. Furthermore, excellent catalyst activity can be achieved owing to the combination of zirconia in the surface layer and rhodium supported thereon.

The term "relatively rich in" as used herein for the metal oxide comprising a core part and a surface layer is used with respect to the molar fraction based on the total molar number of metals in each of the core part and the surface layer. Accordingly, for example, the "core part relatively rich in ceria" means that the molar fraction of cerium (Ce) of ceria in the core part is higher than the molar fraction of cerium in the surface layer.

In one embodiment of the exhaust gas purifying catalyst of the present invention, the molar fraction of cerium is from 35 to 50 mol %, particularly from 45 to 48 mol %, based on the total molar number of cerium and zirconium in the metal oxide particle.

In another embodiment of the exhaust gas purifying catalyst of the present invention, the total molar fraction of cerium and zirconium may be at least 85 mol %, particularly at least 90 mol %, more particularly at least 95 mol %, based on the total molar number of metals in the metal oxide particle.

According to these embodiments, OSC provided by ceria in the core part and high heat resistance attributable to zirconia in the surface layer can be satisfactorily achieved.

In another embodiment of the exhaust gas purifying catalyst of the present invention, the metal oxide particle has an average particle diameter of less than 10 μm, less than 5 μm, less than 1 μm, less than 500 nm, less than 200 nm, less than 100 nm or less than 50 nm.

In another embodiment of the exhaust gas purifying catalyst of the present invention, at least one element selected from the group consisting of alkaline earth metals and rare earths, particularly yttrium, is added to the core part relatively rich in ceria.

According to this embodiment, the heat resistance and the OSC of the core part relatively rich in ceria can be enhanced.

In another embodiment of the exhaust gas purifying catalyst of the present invention, at least one element selected from the group consisting of alkaline earth metals and rare earths, particularly yttrium, is added to the surface layer relatively rich in zirconia.

According to this embodiment, the oxygen conductivity of the surface layer is improved and therefore, the OSC provided by ceria in the core part can be satisfactorily utilized. Furthermore, according to this embodiment, heat resistance of the surface layer is improved.

The production process of an exhaust gas purifying catalyst of the present invention comprises providing a sol containing at least a population of ceria colloid particles and a population of zirconia colloid particles differing in the isoelectric point with each other; adjusting the pH of the sol to be closer to the isoelectric point of the population of ceria colloid particles than to the isoelectric point of the population of zirconia colloid particles, thereby aggregating the population of ceria colloid particles; adjusting the pH of the sol to be closer to the isoelectric point of the population of zirconia colloid particles than to the isoelectric point of the population of ceria colloid particles, thereby aggregating the population of zirconia colloid particles onto the population ceria colloid particles aggregated; drying and firing the obtained aggregate to obtain a metal oxide particle comprising a core part relatively rich in ceria and a surface layer relatively rich in zirconia; and loading rhodium on the obtained metal oxide particle.

According to the process of the present invention, an exhaust gas purifying catalyst comprising a metal oxide particle and rhodium supported thereon can be obtained, wherein the metal oxide particle comprises a core part relatively rich in ceria and a surface layer relatively rich in zirconia, and the core part and the surface layer each comprises a plurality of primary particles.

The metal oxide particle obtained can have a relatively small particle diameter, for example, an average particle diameter of less than 10 μm, less than 5 μm, less than 1 μm, less than 500 nm, less than 200 nm, less than 100 nm or less than 50 nm. For example, when the sol used as a raw material has an average particle diameter of about 5 nm, the average particle diameter of the metal oxide particles produced by the process of the present invention can be 50 nm or less. With such a relatively small particle diameter, the surface layer is relatively thin, and the thin surface layer is useful for utilizing good OSC provided by ceria in the core part, despite the presence of the surface layer.

The term "colloid particles" as used herein means particles which comprise a metal oxide or a metal bonded to oxygen dispersed in a liquid, particularly water, and which produces a metal oxide when the dispersion medium is removed and the residue is fired. The "colloid particles" are generally understood to have a diameter of 1 to 1,000 nm, particularly from 1 to 500 nm. For example, a sol containing a population of colloid particles having a diameter of less than 100 nm or less than 50 nm is available.

The term "sol" as used herein means a dispersion system wherein colloid particles are dispersed in a dispersion medium which is a liquid, and this is sometimes referred to as a colloid solution. The dispersion medium contained in the sol is generally water, but an organic dispersion medium such as alcohol and acetylacetone may be contained, if desired.

BRIEF DESCRIPTIONS OF THE DRAWINGS

BEST MODE FOR CARRYING OUT THE INVENTION

Figure 1:
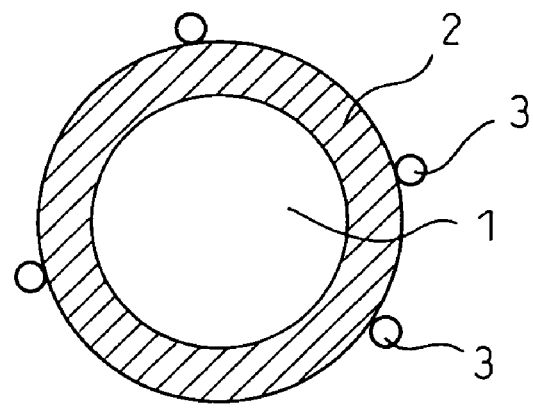
FIG. 1 is a cross-sectional view showing one embodiment of the catalyst of the present invention.
Figure 2:
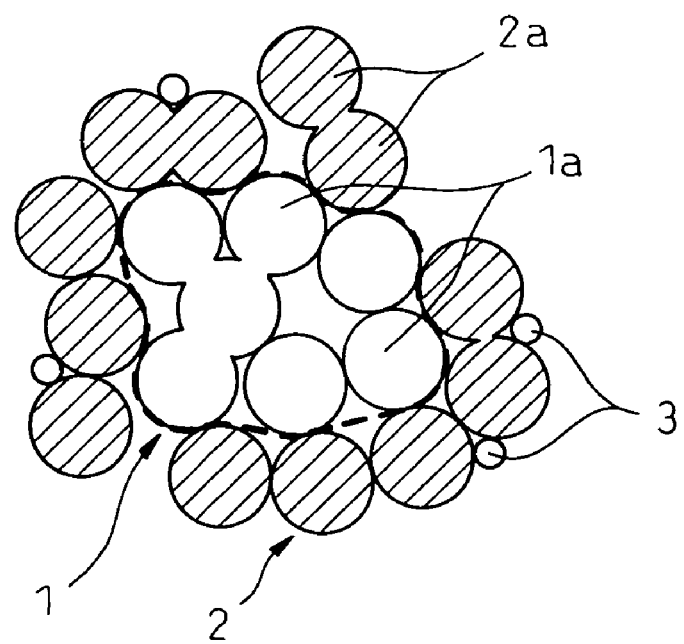
FIG. 2 is a cross-sectional view showing the another embodiment of the catalyst the present invention.

The present invention is described below by referring to FIGS. 1 and 2. FIGS. 1 and 2 each is a cross-sectional view of the catalyst of the present invention.

As shown in FIG. 1, the exhaust gas purifying catalyst of the present invention comprises a core part 1 relatively rich in ceria and a surface layer 2 relatively rich in zirconia, in which rhodium 3 is supported on the surface layer 2. As shown in FIG. 2, the core part 1 and the surface layer 2 each may comprise a plurality of primary particles (1a, 2a).

This metal oxide particle may have an average particle diameter of, for example, less than 10 μm, less than 5 μm, less than 1 μm, less than 500 nm, less than 200 nm, less than 100 nm or less than 50 nm.

The boundary between the core part 1 and the surface layer 2 may not be necessarily distinct and may appear as a portion where the composition is gradually changed. Furthermore, the boundary part between the core part 1 and the surface layer 2 may be a mixture, particularly a solid solution, of ceria and zirconia. In FIG. 1, the surface layer 2 is shown as if it is continuous, but the surface layer may be discontinuous as shown in FIG. 2.

In the case where the core part and the surface layer each comprises a plurality of primary particles and the metal oxide particle is formed from a sol, these primary particles correspond to the colloid particles in the sol, and a distinct boundary may or may not be present between respective primary particles.

The surface layer or core part of the metal oxide particle of the present invention may contain a metal other than cerium (Ce) and zirconium (Zr), for example, a metal selected from the group consisting of alkaline earth metals and rare earth elements, particularly yttrium (Y). The metal oxide of alkaline earth metal or rare earth element, particularly yttrium, tends to provide excellent heat resistance to zirconia, ceria and/or ceria-zirconia solid solution.

The exhaust gas purifying catalyst of the present invention may be used not only by shaping the catalyst itself, but also by coating it on a monolith substrate, for example, a ceramic honeycomb.

The exhaust gas purifying catalyst of the present invention may be produced by any method but can be produced particularly by the process of the present invention.

Respective steps in the process of the present invention are described below.

<Provision of Sol Mixture>

In the process of the present invention, a sol comprising at least a population of ceria colloid particles and a population of zirconia colloid particles is provided, those populations differing, in isoelectric point, from each other.

Specific examples of the sol include substances obtained by hydrolyzing and condensing an alkoxide, an acetylacetonate, an acetate or a nitrate of metal. Further, a sol such as zirconia sol and ceria sol is a known material and may also be available as a commercial product.

The metal oxide sol generally available on the market has a pH distant from the isoelectric point of the colloid particles contained therein, so that the colloid particles contained can electrostatically repel each other to prevent aggregation. That is, a sol containing colloid particles having an isoelectric point on the alkali side is stabilized by acidifying the sol (acid-stabilized sol), and a sol containing colloid particles having an isoelectric point on the acidic side is stabilized by alkalifying the sol (alkali-stabilized sol).

The isoelectric point of the colloid particles does not necessarily depend on a material itself constituting the particles, such as oxide, but can be arbitrarily set by the surface modification of colloid particles, particularly by the surface modification of colloid particles with an organic compound. Accordingly, the populations of ceria and zirconia colloid particles for use in the process of the present invention each may be arbitrarily selected to have appropriate pHs for the process of the present invention. For example, these populations of colloid particles can be selected to give a difference of 3 or more, particularly 4 or more, more particularly 5 or more, between the isoelectric points of the populations of colloid particles.

The isoelectric point of a population of colloid particles, which must be known for the process of the present invention, may be determined by any method but can be measured, for example, by an electrophoretic light scattering method.

The sol containing at least two kinds of colloid particles, which can be used in the process of the present invention, may be obtained by any method but in particular, the sol can be obtained by mixing different kinds of sols. The mixing ratio of populations of colloid particles can be arbitrarily determined depending on the desired properties of the metal oxide particle.

In the process of the present invention, the element such as alkaline earth metal and rare earth, which are preferably contained in the metal oxide particle, can be contained in the sol not only as colloid particles but also as a metal salt such as nitrate.

<Aggregation of Ceria Colloid Particles>

In the process of the present invention, the pH of the sol is then adjusted to be closer to the isoelectric point of the population of ceria colloid particles than to the isoelectric point of the population of zirconia colloid particles, thereby aggregating the population of ceria colloid particles.

As described above, the metal oxide sol generally available on the market has a pH different from the isoelectric point of a population of colloid particles contained, so that the colloid particles can electrostatically repel each other to prevent aggregation.

Accordingly, when the pH of a sol containing a population of ceria colloid particles and a population of zirconia colloid particles is changed to the vicinity of the isoelectric point of the population of ceria colloid particles, for example into the range of ±1.0, particularly ±0.5, of the isoelectric point of the population of ceria colloid particles, as in the present invention, the zeta potential of the population of ceria colloid particles becomes small and this allows for little generation of electrical repulsion between particles, whereby aggregation of the population of ceria colloid particles is accelerated. Here, the pH of the sol is relatively distant from the isoelectric point of the population of zirconia colloid particles and therefore, the population of zirconia colloid particles has a relatively large zeta potential and is prevented from aggregation.

Incidentally, in aggregating the colloid particles, if the pH of the sol is changed to pass though the isoelectric point of the colloid particles intended to be aggregated, the zeta potential of the colloid particles becomes zero when the pH of the sol passes through the isoelectric point thereof, so that aggregation of this colloid particles can be unfailingly attained.

The pH of the sol can be adjusted by adding any acid or alkali. Examples of the acid which can be used include mineral acids such as nitric acid and hydrochloric acid, and examples of the alkali which can be used include aqueous ammonia and sodium hydroxide. The pH of the sol can also be adjusted by merely mixing multiple species of sols.

The pH of the sol can be adjusted by a method of adding an acid or an alkali to the sol while measuring the pH of the sol by a pH meter, or a method of predetermining the amount of acid or alkali necessary for the pH adjustment by using a previously sampled sol, and adding the acid or alkali to the entire sol in the predetermined amount.

<Aggregation of Zirconia Colloid Particles>

In the process of the present invention, the pH of the sol is then adjusted to be closer to the isoelectric point of the population of zirconia colloid particles than to the isoelectric point of the population of ceria colloid particles, thereby aggregating the population of zirconia colloid particles onto the periphery of the population ceria colloid particles aggregated.

When the pH of the sol containing the population ceria colloid particles aggregated is changed to the vicinity of the isoelectric point of the population of zirconia colloid particles, the zeta potential of the population of zirconia colloid particles becomes small and this allows for little generation of electrical repulsion between particles, whereby aggregation of the population of zirconia colloid particles is accelerated. In this stage, the pH of the sol is relatively different from the isoelectric point of the population of ceria colloid particles, so that the population of ceria colloid particles can be prevented from aggregation and the population of zirconia colloid particles can deposit onto the periphery of the population of ceria colloid particles aggregated.

The pH of the sol can be adjusted in the same manner as in the above-described aggregation of ceria.

<Drying and Firing of Aggregate>

The thus-obtained aggregate is dried and fired, whereby a metal oxide particle comprising a core part relatively rich in ceria and a surface layer relatively rich in zirconia, the core part and the surface layer each comprising a plurality of primary particles, can be obtained.

The removal and drying of dispersion medium from sol may be performed by any method at any temperature. For example, this can be achieved by placing the sol in an oven at 120° C. The raw material obtained by removing and drying the dispersion medium from the sol is fired, whereby the metal oxide particle can be obtained. The firing may be performed at a temperature generally employed for producing metal oxides, for example, at a temperature of 500 to 1,100° C.

<Loading of Rhodium>

In the process of the present invention, finally, rhodium is loaded on the thus-obtained metal oxide particle.

The rhodium can be loaded on the metal oxide particle by using any known method. More specifically, the metal oxide particle is impregnated with a solution containing a salt and/or a complex salt of rhodium, for example, an aqueous rhodium nitrate solution, dried and fired, whereby rhodium can be loaded. The amount of rhodium supported on the metal oxide particle may be from 0.01 to 5 mass %, particularly from 0.1 to 2 mass %, based on the metal oxide particle.

The present invention is described in greater detail below by referring to Examples, but the present invention is not limited thereto.

EXAMPLES

In the following tests, the pH of the sol was measured by using a pH meter wherein the pH meter electrode was directly dipped in the sol.

Example 1

In this Example, a metal oxide particle comprising a core part relatively rich in ceria and a surface layer relatively rich in zirconia ($CeO_2:ZrO_2:Y_2O_3=45:52:3$ (by mol)) is obtained, and rhodium is supported thereon.

An alkali-stabilized ceria sol (isoelectric point: pH 3.5), an acid-stabilized zirconia sol (isoelectric point: pH 8.5) and an yttria sol were mixed to give the above-described molar ratio, thereby rendering the sol mixture acidic and aggregating ceria. Thereafter, an aqueous 5M ammonia ($NH_3$) solution was added dropwise with stirring to adjust the pH to 11, thereby aggregating zirconia. The resulting solution was dried at 120° C. for 24 hours, and the dried product was fired at 700° C. for 5 hours to obtain metal oxide particles.

The thus-obtained metal oxide particles were dispersed in distilled water which was in an amount of 6-fold weight, a rhodium nitrate solution was added thereto so that rhodium is in an amount of 0.5 wt % based on the metal oxide particle, and the resulting solution was stirred for 1 hour. Thereafter, the water content was removed by drying at 120° C., the residue was fired at 500° C. for 2 hours. The obtained catalyst was shaped into a 1 mm-square pellet and used for the evaluation of performance.

Example 2

In this Example, a catalyst was obtained in the same manner as in Example 1 except that the molar ratio of components in the metal oxide particle was changed to $CeO_2:ZrO_2:Y_2O_3=48:49:3$.

Example 3

In this Example, a catalyst was obtained in the same manner as in Example 1 except that the molar ratio of components in the metal oxide particle was changed to $CeO_2:ZrO_2:Y_2O_3=25:72:3$.

Example 4

In this Example, a catalyst was obtained in the same manner as in Example 1 except that the molar ratio of components in the metal oxide particle was changed to $CeO_2:ZrO_2:Y_2O_3=50:47:3$.

Example 5

In this Example, a catalyst was obtained in the same manner as in Example 1 except that the molar ratio of components in the metal oxide particle was changed to $CeO_2:ZrO_2:Y_2O_3=55:42:3$.

Example 6

In this Example, a catalyst was obtained in the same manner as in Example 1 except that the molar ratio of components in the metal oxide particle was changed to $CeO_2:ZrO_2:Y_2O_3=75:22:3$.

Comparative Example 1

In this Example, a catalyst was obtained in the same manner as in Example 1 except that a zirconia particle was used as the metal oxide particle.

Comparative Example 2

In this Example, a catalyst was obtained in the same manner as in Example 1 except that a ceria particle was used as the metal oxide particle.

Comparative Example 3

In this Example, a metal oxide particle ($CeO_2:ZrO_2:Y_2O_3=45:52:3$ (by mol)) which is the same as in Example 1 is obtained and platinum is loaded thereon.

Metal oxide particles obtained in the same manner as in Example 1 were dispersed in distilled water which was in an amount of 6-fold weight, a dinitrodiammine platinum solution was added thereto so that platinum is in an amount of 0.5 wt % based on the metal oxide particles, and the resulting solution was stirred for 1 hour. Thereafter, the water content was removed by drying at 120° C., the residue was fired at 500° C. for 2 hours, and the obtained catalyst was shaped into a 1 mm-square pellet and used for the evaluation of performance.

<Evaluation of Catalyst Performance>

The pellet-like catalyst obtained in Examples 1 to 6 and Comparative Examples 1 to 3 were subjected rich and lean gases each having a composition shown in Table 1. The gases were passed therethrough at 1,000° C. for 5 hours and the gases were switched over every one minute. Thereafter, rich and lean gases each having a composition shown in Table 1 were passed through the catalyst and the gases were switched over at 1 Hz while elevating the gas temperature, thereby determining the temperature where the HC (hydrocarbon) purification percentage reached 50% (HC-T50). Also, Co (2%) and $O_2$ (1%) were passed, with switching over therebetween every one minute, and the OSC (oxygen storage capacity) ($O_2$ mmol/support-g) was calculated from the amount of $CO_2$ generated during passing of CO. Furthermore, the specific surface area (SSA) was measured by using a BET one-point method. The results obtained are shown in Table 2 and FIGS. 3 to 5.

TABLE 1

| | Composition of Gas | | | | | | |
|---|---|---|---|---|---|---|---|
| | $N_2$ (%) | $CO_2$ (%) | NO (ppm) | CO (%) | $C_3H_6$ (ppmC) | $H_2$ (%) | $O_2$ (%) | $H_2O$ (%) |
| Rich Gas | balance | 10 | 2200 | 2.80 | 2500 | 0.27 | 0.77 | 10 |
| Lean Gas | balance | 10 | 2200 | 0.81 | 2500 | 0 | 1.7 | 10 |

TABLE 2

| | Results | | | | |
|---|---|---|---|---|---|
| | Amount of $CeO_2$ (mol %) | Noble Metal | SSA ($m^2$/g) | HC-T50 (° C.) | OSC* |
| Ex. 1 | 45 | Rh (0.5 wt %) | 26 | 273 | 0.32 |
| Ex. 2 | 48 | Rh (0.5 wt %) | 24 | 275 | 0.32 |
| Ex. 3 | 25 | Rh (0.5 wt %) | 27 | 283 | 0.02 |
| Ex. 4 | 50 | Rh (0.5 wt %) | 24 | 301 | 0.28 |
| Ex. 5 | 55 | Rh (0.5 wt %) | 24 | 304 | 0.28 |
| Ex. 6 | 75 | Rh (0.5 wt %) | 12 | 348 | 0.06 |

TABLE 2-continued

| | Results | | | |
|---|---|---|---|---|
| | Amount of CeO$_2$ (mol %) | Noble Metal | SSA (m$^2$/g) | HC-T50 (° C.) | OSC* |
| Comp. Ex. 1 | 0 | Rh (0.5 wt %) | 28 | 281 | 0.00 |
| Comp. Ex. 2 | 100 | Rh (0.5 wt %) | 9 | 354 | 0.05 |
| Comp. Ex. 3 | 45 | Pt (0.5 wt %) | 26 | 350 | 0.30 |

*Unit of OSC: O$_2$ mmol/support-g

Figure 3:
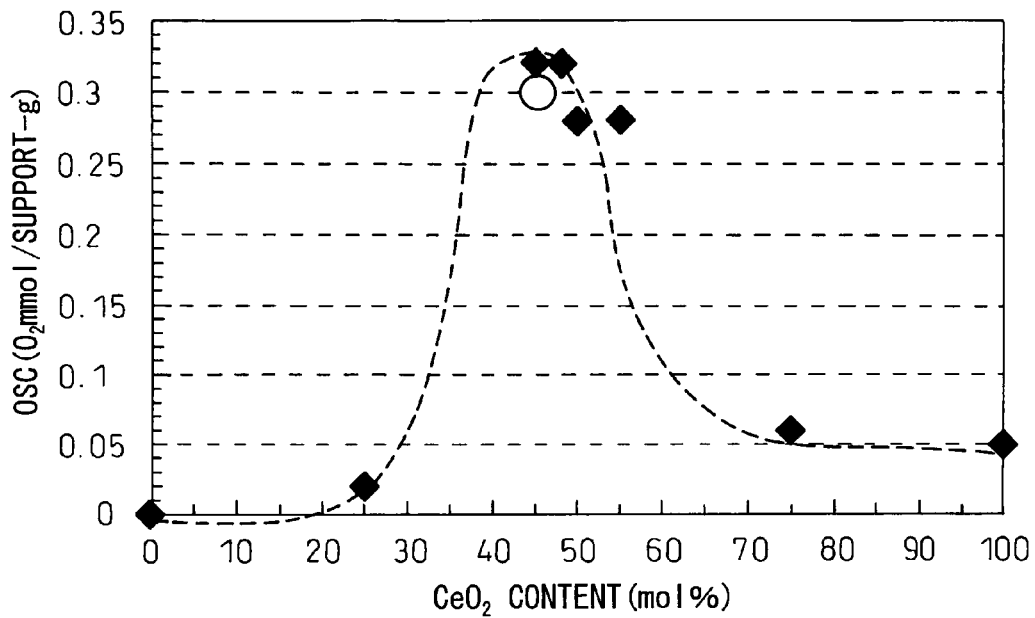
FIG. 3 shows a relationship between the CeO$_2$ contents of catalysts and the OSC of supports in Examples and Comparative Examples.
Figure 4:
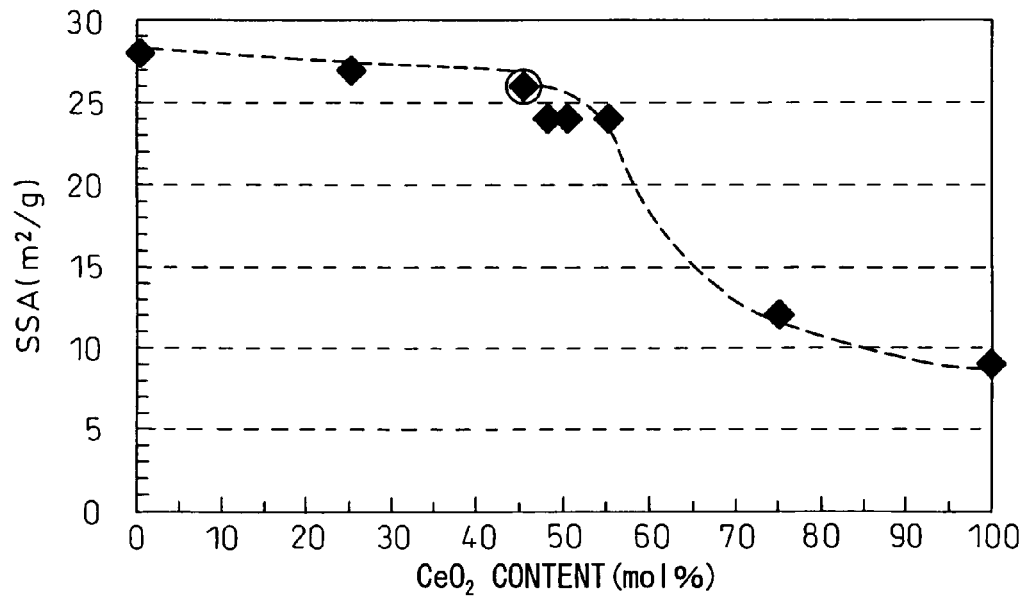
FIG. 4 shows a relationship between the CeO$_2$ contents of catalysts and the specific surface areas of supports in Examples and Comparative Examples.
Figure 5:
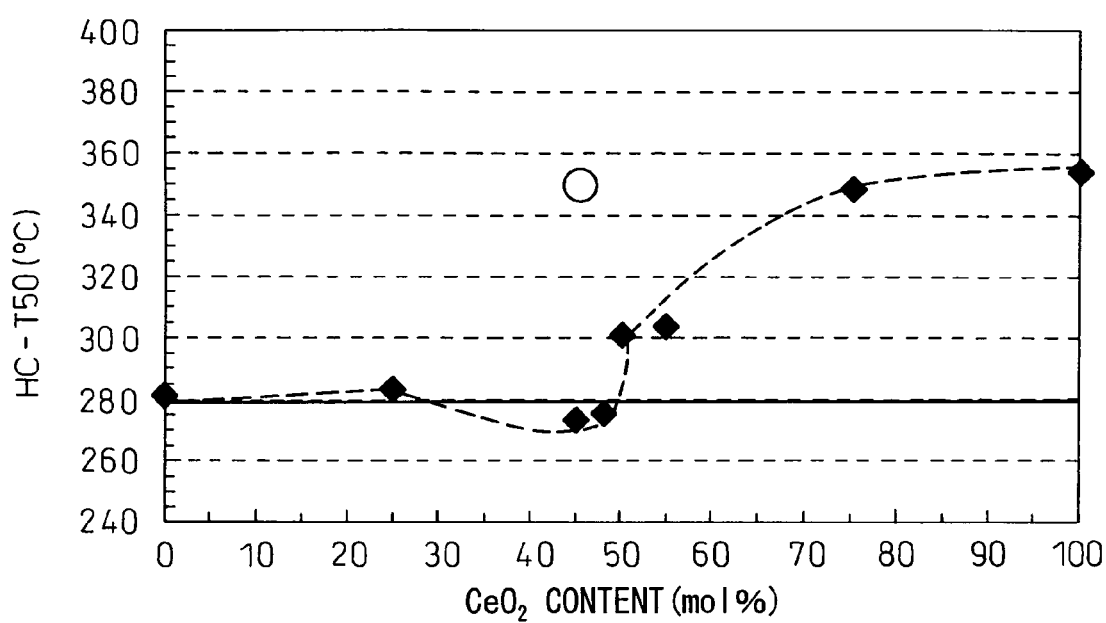
FIG. 5 shows the relationship between the CeO$_2$ contents of catalysts and the HC-T50 temperatures in Examples and Comparative Examples.

As is apparent from Table 2 and FIGS. 3 and 4, the catalysts of Examples 1 to 6 maintain a relatively large specific surface area while providing OSC. Among these Examples 1 to 6, the catalysts of Examples 1 and 2 having a ceria content of 45 mol % and 48 mol % realize both high OSC and a large surface area, and thereby exhibit particularly low HC-T50 temperature, that is, excellent low-temperature catalyst activity (see, FIG. 5).

As described above, Comparative Example 3 (shown by white circle in FIGS. 3 to 5) is an exhaust gas purifying catalyst obtained by loading platinum on the same metal oxide particle as in Example 1 which exhibits a most excellent HC-T50 temperature among Examples 1 to 6. However, in all of Examples 1 to 6 of the present invention, the HC-T50 temperature is lower than that of Comparative Example 3. This reveals that it is very useful to load rhodium on a metal oxide particle comprising a core part relatively rich in ceria and a surface layer relatively rich in zirconia.

The invention claimed is:

1. A process for producing an exhaust gas purifying catalyst, comprising:
   providing a sol containing at least a population of ceria colloid particles and a population of zirconia colloid particles differing in the isoelectric point with each other, the difference between the isoelectric points being at least 3,
   adjusting the pH of said sol to be closer to the isoelectric point of said population of ceria colloid particles than to the isoelectric point of said population of zirconia colloid particles, thereby aggregating said population of ceria colloid particles,
   adjusting the pH of said sol to be closer to the isoelectric point of said population of zirconia colloid particles than to the isoelectric point of said population of ceria colloid particles, thereby aggregating said population of zirconia colloid particles onto said aggregated population of ceria colloid particles,
   drying and firing the obtained aggregate to obtain a metal oxide particle comprising a core part relatively rich in ceria and a surface layer relatively rich in zirconia, and loading rhodium on the obtained metal oxide particle.

2. The process according to claim 1, wherein the molar fraction of cerium is from 35 to 50 mol% based on the total molar number of cerium and zirconium in said metal oxide particle.

3. The process according to claim 1, wherein the total molar fraction of cerium and zirconium is at least 85 mol% based on the total molar number of metals in said metal oxide particle.

4. The process according to claim 1, wherein the pH of the sol adjusted to pass through the isoelectric point of the population of ceria colloid particles, thereby aggregating said population of ceria colloid particles; and
   wherein the pH of the sol is adjusted to pass through the isoelectric point of the population of zirconia colloid particles, thereby aggregating said population of zirconia colloid particles.

* * * * *